United States Patent [19]

Burrill

[11] Patent Number: 4,472,465
[45] Date of Patent: Sep. 18, 1984

[54] SILOXANE POLYESTER COMPOSITIONS AND USE THEREOF

[75] Inventor: Peter M. Burrill, Cowbridge, Wales

[73] Assignees: Dow Corning Limited, Barry, Wales; Dow Corning Limited, Barry, Wales

[21] Appl. No.: 519,286

[22] Filed: Aug. 1, 1983

[30] Foreign Application Priority Data

Aug. 4, 1982 [GB] United Kingdom ................ 8222431

[51] Int. Cl.$^3$ .............................................. B05D 3/02
[52] U.S. Cl. ..................................... 427/387; 428/447; 524/761; 524/762; 524/764; 525/446; 528/17; 528/26
[58] Field of Search ................ 525/446; 524/761, 762, 524/764; 528/17, 26; 428/447; 427/387

[56] References Cited

U.S. PATENT DOCUMENTS 2,917,414 12/1959 McLean .............................. 525/446
3,622,529 11/1971 Evans ...................................... 528/17
4,348,510 9/1982 Keck et al. ............................ 528/17

FOREIGN PATENT DOCUMENTS 907302 10/1962 United Kingdom ................ 525/446

Primary Examiner—Melvyn I. Marquis
Attorney, Agent, or Firm—Robert L. McKellar; Robert L. McKellar

[57] ABSTRACT

Siloxane-polyester compositions comprising (1) a siloxane-polyester copolymer resin (2) a silane wherein one of the groups attached to silicon is an organic group containing at least one amino group, the remaining valencies of the silicon being satisfied by alkoxy, alkoxyalkoxy, methyl or phenyl groups there being present at least two alkoxy or alkoxyalkoxy groups, (3) a solvent for the siloxane-polyester copolymer and (4) a titanium chelate.

The presence of (2) and (4) improves the rate of cure of the siloxane-polyester, and the compositions are useful for providing decorative and protective coatings on metals, plastics and other substrates.

9 Claims, No Drawings

SILOXANE POLYESTER COMPOSITIONS AND USE THEREOF

This invention relates to compositions comprising siloxane-polyester copolymers and to the use of such compositions for coating substrates.

Compositions based on copolymerisation products of siloxanes and polyesters have been known and used for many years. Such siloxane-polyesters have found application mainly in coating compositions, particularly in protective and decorative paints for metals such as mild steel and aluminium. Although compositions based on siloxane-polyester copolymers are relatively successful from a commercial and technical standpoint they require long cure times and/or high cure temperatures in order to achieve the optimum in such properties as hardness and abrasion resistance in the cured film. There has thus existed a need for improved siloxane-polyester compositions which can be cured under milder conditions without sacrificing the desired properties in the cured coating.

According to this invention there is provided a composition which comprises (1) a siloxane-polyester copolymer resin having an average at least two groups per molecule selected from the $\equiv$SiOH and $\equiv$COH groups (2) a silane of the general formula

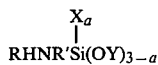

wherein R represents a hydrogen atom, an alkyl group having from 1 to 4 inclusive carbon atoms or an aliphatic hydrocarbon group attached to the nitrogen atom through a carbon to nitrogen bond and containing at least one amino group, R' represents an alkylene group having 3 or 4 carbon atoms, X represents a methyl or a phenyl group, Y represents an alkyl or an alkoxyalkyl group having less than 5 carbon atoms and a has a value of 0 or 1, (3) one or more solvents for the siloxane-polyester copolymer and (4) a titanium chelate which is selected from a group consisting essentially of dialkoxytitanium bis-(acetylacetonate) and dialkoxytitanium bis-(ethylacetoacetate).

Included within the scope of this invention is a process for preparing the said compositions by mixing components (1), (2), (3) and (4), and a process for coating a substrate which comprises applying thereto a composition according to the invention.

The siloxane-polyesters (1) employed in the production of the compositions of this invention can be prepared by known procedures. They are generally prepared by preforming the siloxane and polyester precursors and thereafter heating these together in the presence of a suitable solvent. As the siloxane precursor there can be used low molecular weight organosiloxanes having silicon-bonded groups reactive with the hydroxyl groups in the polyester precursor. The organic groups in the siloxane are usually lower alkyl e.g. methyl, ethyl and propyl, or phenyl, or mixtures of such groups and the reactive groups are generally hydroxyl, alkoxy or alkoxyalkoxy e.g. methoxy, ethoxy and methoxyethoxy. Such organosiloxane precursors are well known and a number are commercially available. They include, for example, alkoxylated polymers of monophenylsiloxane units, alkoxylated copolymers of monophenylsiloxane and dimethylsiloxane units, alkoxylated copolymers of phenylmethylsiloxane and monomethylsiloxane units, alkoxylated copolymers of phenylmethylsiloxane and monophenylsiloxane units, hydroxylated copolymers of phenylmethylsiloxane and monoethylsiloxane units and hydroxylated copolymers of monophenylsiloxane and monopropylsiloxane units. The siloxane polymer and copolymer precursors can be prepared by known procedures, for example by the hydrolysis or cohydrolysis of the corresponding alkoxy silanes and condensation of the hydrolysis product.

The hydroxyl-containing polyesters which are reacted with the siloxane precursor are also well known materials. They can be obtained by the reaction of one or more aromatic dicarboxylic acids, normally phthalic acid, isophthalic acid or terephthalic acid, or esters and anhydrides thereof with one or more dihydric or polyhydric alcohols having from 2 to 6 carbon atoms, for example ethylene glycol, 1,2-propylene glycol, glycerol, trimethylolpropane, trimethylolethane and pentaerythritol. If desired a saturated aliphatic dicarboxylic acid may be incorporated into the polyester although such addition is kept to a minimum where maximum hardness in the copolymer is required.

During the preparation of the siloxane-polyester the reaction may be expedited by the inclusion of a catalyst such as butyl titanate or propyl zirconate. In order to provide for the presence of residual $\equiv$SiOR and/or $\equiv$COH groups in the siloxane-polyester the reaction should be only carried so far as is consistent with the desired proportion of these groups in the copolymer. It is preferred to employ a solvent for the reaction, some of which at least can remain as the, or part of the, solvent (3) for the siloxane-polyester. The ratios of siloxane and polyester precursors employed in the preparation of the copolymer resin will depend upon the balance of properties desired in the copolymer. For example, the copolymer may comprise by weight from 15 to 80% of siloxane and 85 to 20% of polyester. In general, however, the preferred copolymers are those prepared employing 35–80% by weight of siloxane and 65–20% by weight of polyester. Examples of siloxane-polyesters which may be employed as ingredient (1) of the compositions of this invention and methods for their preparation are described in U.K. Pat. Nos. 815 107, 1 070 174, 1 346 864 and 1 485 368.

Ingredient (2) of the compositions of this invention is a silane having silicon bonded hydrocarbonoxy groups and a silicon-bonded hydrocarbon group (preferably having no more than 12 carbon atoms) containing at least one amino group. In the general formula of the silane R may be hydrogen, lower alkyl or an aliphatic group containing at least one amino group, for example the group H$_2$NQ—, wherein Q is a divalent hydrocarbon radical e.g. —CH.CH$_3$CH$_2$—, —(CH$_2$)$_4$— or —(CH$_2$)$_5$—, or the group —(CH$_2$CH$_2$NH)$_z$H wherein z is 0 or an integer, preferably 1 or 2. The substituent Y may represent, for example, methyl, ethyl or methoxyethyl. Preferred as ingredient (2) are compounds represented by the formulae

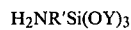

wherein R' represents —(CH$_2$)$_3$— or CH$_2$.CH$_3$CHCH$_2$— and each Y represents methyl, ethyl or methoxyethyl. The silane (2) may be employed in a proportion of from about 3 to about 50%, preferably 6 to 20%, by weight based on the weight of the siloxane-polyester (1).

The compositions of this invention contain one or more solvents (3) for the siloxane-polyester. Examples of solvents which can be employed are xylene, toluene, benzene, alcohols e.g. isopropanol and n-butanol, the ethers and esters of ethylene glycol, for example ethylene glycol monoethyl ether, ethylene glycol dimethyl ether, ethylene glycol monoethylether acetate and diethylene glycol monoethylether acetate; the preferred solvents being the lower monohydric alcohols and the ethers of the ethylene and propylene glycols. The proportion of solvent employed is not critical and will depend upon the type of application in which the composition is employed. Where very thin coatings are desired the solvent may comprise the major proportion of the weight of the composition, for example up to about 85% by weight. Lower proportions of solvent e.g. down to about 20% may be employed where the application calls for a thicker deposition of siloxane-polyester.

The remaining essential ingredient of the composition is titanium chelate (4). This may be any dialkoxytitanium bis-(acetylacetonate) or dialkoxytitanium bis-(ethylacetoacetate), the preferred chelates being those wherein the alkoxy groups are isopropoxy or ethoxy. From about 1 to about 25 percent, preferably 5-15 percent, by weight of the titanium chelate, based on the weight of siloxane-polyester, are generally employed. More than 25 percent of the chelate can be used but no significant further advantage is believed to accrue from the use of such increased proportions.

Preparation of the compositions of this invention is carried out by mixing the ingredients (1) to (4). For the best results it is preferred that the silane (2) and chelate (4) are not mixed with the siloxane-polyester copolymer until the composition is required for use. In practice the siloxane-polyester copolymer is normally prepared as a solution in one or more organic solvents. In accordance with conventional techniques the solvent content of the solution may be adjusted to the desired level during or following the preparation of the copolymer by the removal or addition of solvent, including the replacement or partial replacement of the original solvent(s) with other solvents. Thus, the solvent solution of the siloxane-polyester, the silane and the titanium chelate may be packaged separately for storage and shipment and mixed in the desired proportions when they are to be used. More conveniently the composition can be provided as a two package product, the one package comprising the organic solvent solution of the siloxane-polyester copolymer and the other a mixture of the silane (2) and chelate (4).

If desired, the incorporation of this silane and the chelate with the siloxane-polyester may be facilitated by the use of a diluent for each of these ingredients. When the silane and chelate are packaged as a mixture the use of a diluent therefor is particularly desirable as a means of limiting the increase in viscosity which may occur following the mixing of (2) and (4).

The compositions of this invention are particularly adapted for the formation of protective and decorative coatings on metals e.g. steel, aluminium and copper, plastics e.g. acrylics and polycarbonates, and other substrates to which they may be applied employing any appropriate technique, for example brushing, spraying, dip coating, roller coating and flow coating. They may be employed as clear coating materials or may be dyed or pigmented to any desired colour. Thin films of the composition may be cured to hard, adherent abrasion resistant coatings at temperatures as low as about 130° C., whereas siloxane-polyester compositions not containing (2) and (4) generally require a cure temperature of at least 200° C. to produce comparable coatings in a practicable time.

The following examples, in which the parts are expressed by weight, Me represents methyl and Et represents ethyl, illustrate the invention.

EXAMPLE 1

A polyester resin (28 parts) prepared by the reaction of dimethylterephthalate, trimethylolpropane and neopentyl glycol and having 8% by weight hydroxyl groups was mixed with a low molecular weight methylphenylsiloxane resin (42 parts) having about 7% by weight silanol groups, cellosolve acetate (30 parts) and a transesterification catalyst and the mixture heated to 150° C. for 4 hours to provide a siloxanepolyester copolymer having residual silanol and $\equiv$COH groups. The solids content of the siloxane-polyester was adjusted to 65% by the addition of further cellosolve acetate and this solution (45 parts) further diluted with butanol (23 parts) and propylene glycol methyl ether (23 parts). The silane $H_2NCH_2CH_2NH(CH_2)_3Si(OMe)_3$ (4 parts) and diisopropoxytitanium bis-(acetylacetonate) (3 parts) were then stirred into the siloxane-polyester solution and the solution applied to previously degreased aluminium panels by flow coating.

The coated panels were allowed to air dry for about 15 minutes at 25° C. and then placed in an oven at 150° C. for 30 minutes.

The cured coating had a thickness of about 6 microns. When tested for solvent and abrasion resistance the coating withstood 30 double rubs with a cloth soaked in acetone and 500 rubs on the Martindale Abrasion Tester. The cured coating was sufficiently flexible to survive bending around an 18 mm diameter mandrel.

When placed in concentrated (36%) HCl the coated panel exhibited no sign of corrosion for at least 10 minutes. Subjection of the coated panel to the corrosion resistance test ASTM B287-62, CASS 72 hours, resulted in slight spotting of the panel.

EXAMPLE 2

A polyester resin (24 parts) prepared by the reaction of dimethylterephthalate and trimethylolpropane, and having about 8% hydroxyl groups was mixed with a low molecular weight methylphenylsiloxane resin (36 parts) having about 7% by weight silanol groups, cellosolve acetate (40 parts) and a transesterification catalyst and the mixture heated to 150° C. for 4 hours to provide a siloxane-polyester copolymer having COH groups and some residual silanol groups.

The solids content of the siloxane-polyester was reduced to about 30% by the addition of n-butanol (50 parts) and butyl glycol ether (50 parts), and the silane $H_2N(CH_2)_2NH(CH_2)_3Si(OMe)_3$ (5 parts) and ethoxyisopropoxy titanium bis(acetylacetonate) (3 parts) were stirred into 100 parts of the diluted siloxane-polyester solution until homogeneous. The resulting composition was employed to coat previously degreased steel panels by spraying, the panels allowed to air dry for about 15 minutes at 25° C. and then placed in an oven for 30 minutes at 150° C.

The cured coating was colourless, had a thickness of about 6 microns and exhibited 2H pencil hardness. It survived bending around a 6 mm mandrel and withstood 200 double rubs with a weighted cloth soaked in methylethyl ketone. When subjected to the corrosion resistance test ASTM B287-62, CASS, the panels gave protection for 100 hours.

When the procedure was repeated with the amino silane replaced with the same weight of $H_2N(CH_2)_2NH(CH_2)_3SiMe(OMe)_2$ the cured coating exhibited H pencil hardness, withstood 50 double rubs with the ketone-soaked cloth and gave protection for 50 hours in the ASTM B287-62, CASS test.

EXAMPLE 3

The procedure of Example 2 was repeated except that the amino silane was replaced with the same weight of $H_2N(CH_2)_3Si(OEt)_3$. The cured film exhibited the same properties as the second prepared composition in Example 2 except that it withstood 90 double rubs with methylethyl ketone.

When the procedure was repeated employing 5 parts of $H_2N(CH_2)_3Si(OMe)_3$ similar properties were obtained except that the cured film withstood 200 double rubs with the ketone-soaked cloth.

EXAMPLE 4

The procedure of Example 2 was repeated except that the amino silane was replaced with 5 parts of $H_2N(CH_2)_2NH(CH_2)_2NH(CH_2)_3Si(OMe)_3$.

The cured coating exhibited H pencil hardness, survived bending around a 6 mm diameter mandrel and withstood 200 double rubs with a cloth soaked in methylethyl ketone.

That which is claimed is:

1. A composition which comprises (1) a siloxane-polyester copolymer resin having an average of at least two groups per molecule selected from the $\equiv$SiOH and $\equiv$COH groups (2) a silane of the general formula $$RHNR'Si(OY)_{3-a}^{X_a}$$

wherein R represents a hydrogen atom, an alkyl group having from 1 to 4 inclusive carbon atoms or an aliphatic hydrocarbon group attached to the nitrogen atom through a carbon to nitrogen bond and containing at least one amino group, R' represents an alkylene group having 3 or 4 carbon atoms, X represents a methyl or a phenyl group, Y represents an alkyl or an alkyoxyalkyl group having less than 5 carbon atoms and a has a value of 0 or 1, (3) one or more solvents for the siloxane-polyester copolymer and (4) a titanium chelate which is selected from a group consisting essentially of dialkoxytitanium bis-(acetylacetonate) and dialkyoxytitanium bis(ethylacetoacetate).

2. A composition as claimed in claim 1 wherein the siloxane-polyester has been prepared employing a methylphenyl siloxane.

3. A composition as claimed in claim 1 wherein the siloxane-polyester copolymer comprises from 35-80% by weight of siloxane and 54-20% by weight of polyester.

4. A composition as claimed in claim 1 wherein the silane (2) has the general formula $$H_2N(CH_2)_2NHR'Si(OY)_3 \text{ or}$$

$$H_2NR'Si(OY)_3$$

wherein R' represents —$(CH_2)_3$— or —$CH_2.CH_3CHCH_2$— and each Y represents methyl, ethyl or methoxyethyl.

5. A composition as claimed in claim 1 wherein the solvent (3) comprises one or more of lower monohydric alcohols and ethers of ethylene glycols and propylene glycols.

6. A composition as claimed in claim 1 which contains from 6 to 20% by weight of silane (2) and from 5 to 15% by weight of the titanium chelate (4), based on the weight of the siloxane-polyester.

7. A process for the preparation of a composition which comprises mixing together (1) a siloxane-polyester copolymer resin having an average of at least two groups per molecule selected from the $\equiv$SiOH and $\equiv$COH groups (2) a silane of the general formula $$RHNR'Si(OY)_{3-a}^{X_a}$$

wherein R represents a hydrogen atom, an alkyl group having from 1 to 4 inclusive carbon atoms or an aliphatic hydrocarbon group attached to the nitrogen atom through a carbon to nitrogen bond and containing at least one amino group, R' represents an alkylene group having 3 or 4 carbon atoms, X represents a methyl or a phenyl group, Y represents an alkyl or an alkoxyalkyl group having less than 5 carbon atoms and a has a value of 0 or 1, (3) one or more solvents for the siloxane-polyester copolymer and (4) a titanium chelate which is selected from a group consisting essentially of dialkoxytitanium bis-(acetylacetonate) and dialkoxytitanium bis(ethylacetoacetate).

8. A process for coating a substrate which comprises applying thereto a composition as claimed in claim 1 and thereafter curing the applied composition.

9. A substrate having a coating of the cured composition of claim 1.

* * * * *

UNITED STATES PATENT AND TRADEMARK OFFICE
CERTIFICATE OF CORRECTION

PATENT NO. : 4,472,465
DATED : September 18, 1984
INVENTOR(S) : Peter M. Burrill It is certified that error appears in the above-identified patent and that said Letters Patent is hereby corrected as shown below:

In column 6, line 8, "54-20%" should read -- 65-20% --.

Signed and Sealed this

Thirtieth Day of July 1985

[SEAL]

Attest:

DONALD J. QUIGG

Attesting Officer     Acting Commissioner of Patents and Trademarks